R. W. SNYDER.
AUTOMATIC VALVE CUT-OFF.
APPLICATION FILED JULY 18, 1919.
1,354,426.
Patented Sept. 28, 1920.
2 SHEETS—SHEET 2.
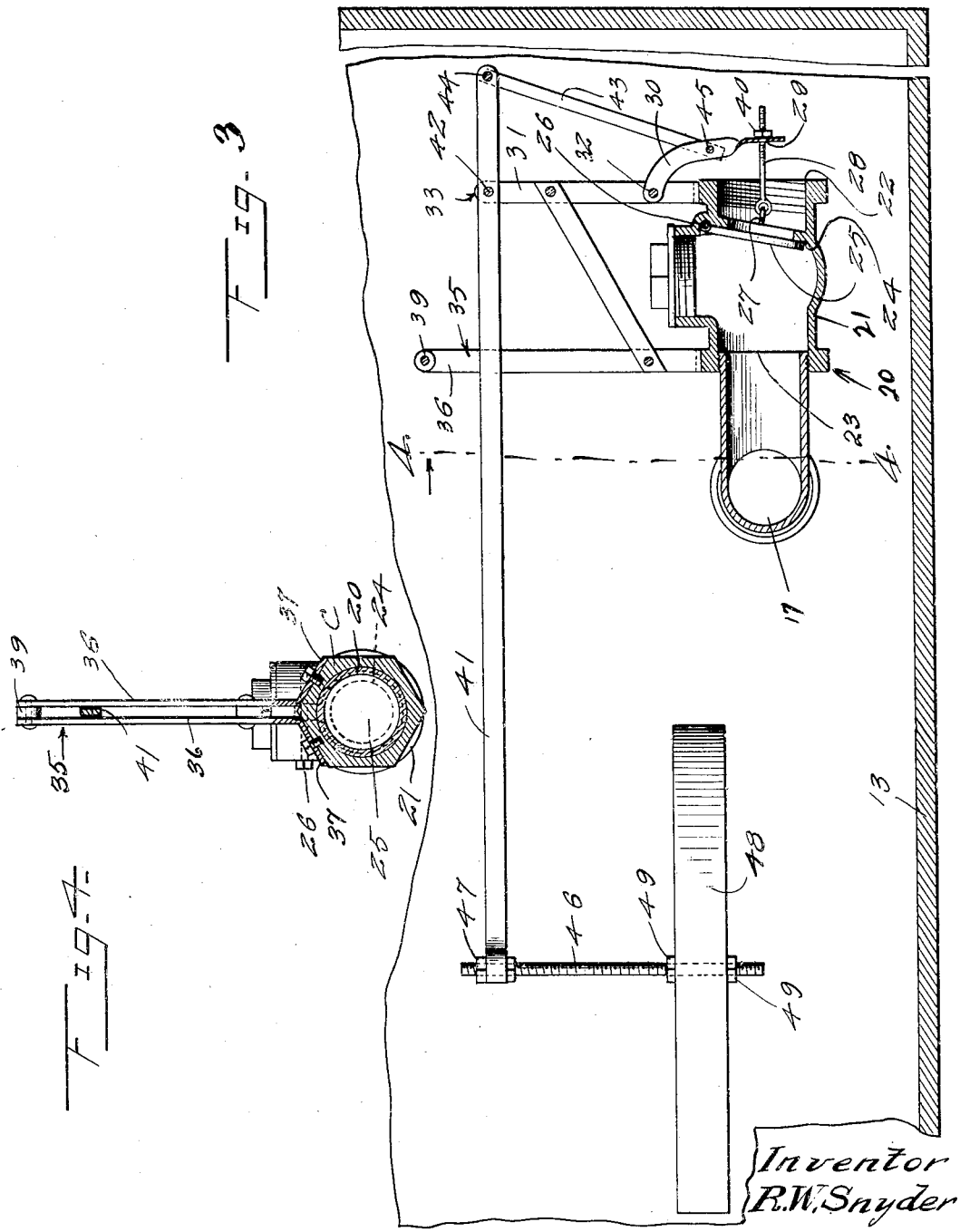
Inventor
R. W. Snyder
By [signature], Atty

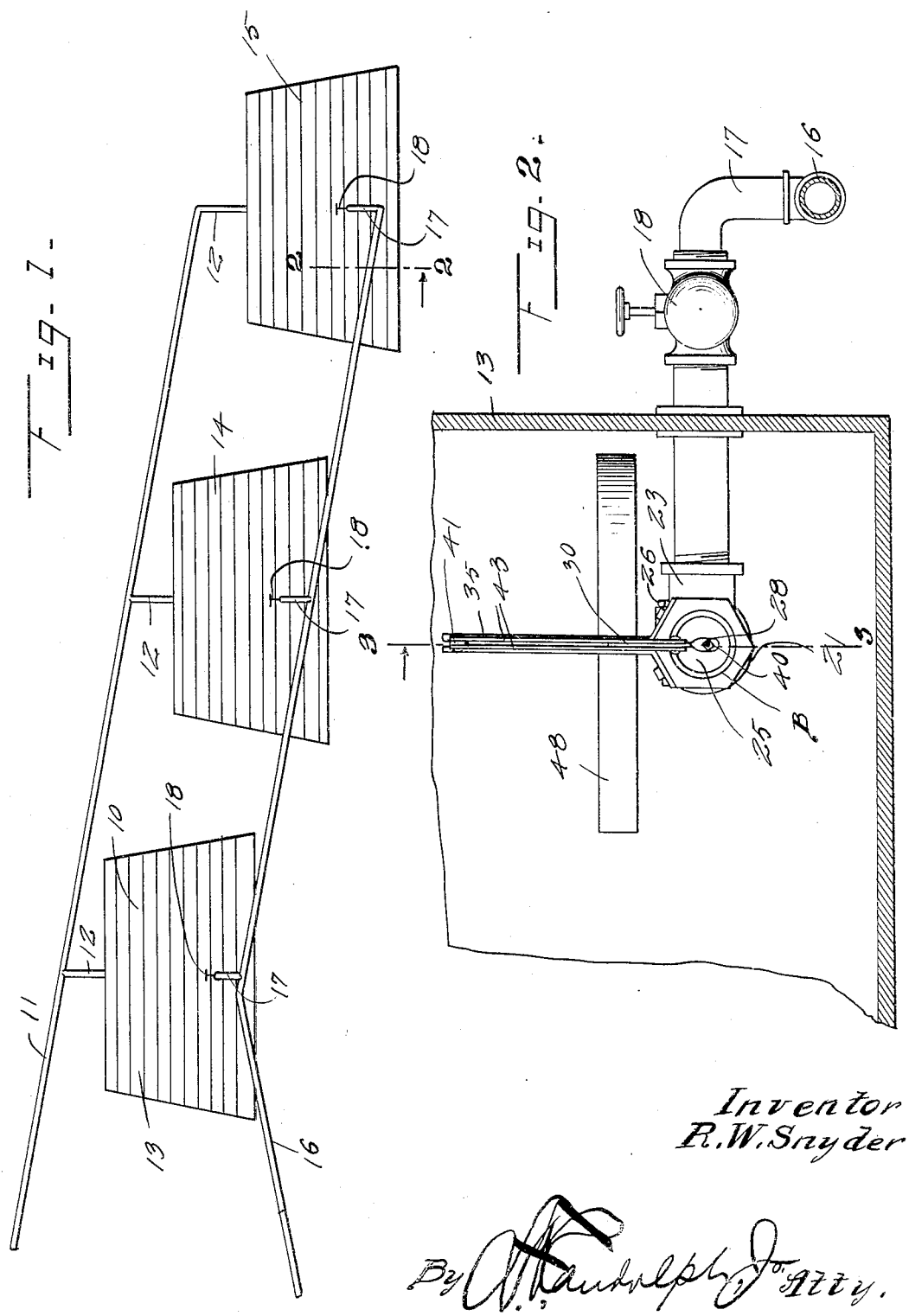

UNITED STATES PATENT OFFICE.

ROBERT W. SNYDER, OF BIGHEART, OKLAHOMA.

AUTOMATIC VALVE CUT-OFF.

1,354,426.    Specification of Letters Patent.    Patented Sept. 28, 1920.

Application filed July 18, 1919. Serial No. 311,707.

*To all whom it may concern:*

Be it known that I, ROBERT W. SNYDER, a citizen of the United States, residing at Bigheart, in the county of Osage and State of Oklahoma, have invented certain new and useful Improvements in Automatic Valve Cut-Offs; and I do hereby declare the following to be a full, clear, and exact description of the invention, such as will enable others skilled in the art to which it appertains to make and use the same.

This invention relates to cutoffs for oil tanks and the primary object of the invention is to provide an improved automatic valve for preventing the entrance of air into the pipe line after the oil has been exhausted from any one of the tanks.

Another object of the invention is to provide an improved automatic valve for preventing oil from backing into the tanks from the pipe line.

A further object of the invention is to provide an improved automatic valve arranged in each of the outlet pipes of each of the tanks arranged to receive the oil from the field so as to prevent the entrance of air into the pipe line from any one of the tanks, if the oil should be exhausted therefrom.

A still further object of the invention is to provide an improved device of the above character which is durable and efficient in use, one that is simple and easy to manufacture, and one that can be placed upon the market at a reasonable cost.

With these and other objects in view, the invention consists in the novel construction, arrangement and formation of parts, as will be hereinafter more specifically described, claimed and illustrated in the accompanying drawings, forming a part thereof, in which:

Figure 1 is a diagrammatic view illustrating the tanks for receiving the oil from the field and the pipe line leading therefrom to the refinery.

Fig. 2 is a vertical section through one of the tanks showing the automatic valve attached thereto, the section being taken on the line 2—2 of Fig. 1.

Fig. 3 is a vertical section taken on the line 3—3 of Fig. 2 showing the automatic valve arranged in the tank and showing the same in section, and Fig. 4 is a vertical section taken on the line 4—4 of Fig. 3.

Referring to the drawings in detail, wherein similar reference characters designate corresponding parts throughout the several views, the numeral 10 generally indicates a battery of tanks for receiving oil from the field through the transfer line 11 which extends over the tops of the tanks and is provided with a plurality of branch pipes 12 leading into the tops of the tanks. The battery 10 includes the tanks 13 and 14 and 15, which are shown positioned at different levels and of different sizes.

The pipe line 16 extends adjacent the bottoms of the tanks and leads to the pump station or refinery and the pipe line is provided with branch pipes 17 which extend into the tanks 13, 14 and 15 and have manually operable valves 18, that form means whereby the oil from the tanks may be turned into the pipe line when desired.

The branch pipes 17 have secured to the inner ends thereof the automatic valves 20 which, as stated, prevent the back flow of oil into the tanks from the pipe line and prevent the entrance of air into the pipe line when any one of the tanks becomes exhausted.

Each of the valves 20 includes a hollow valve casing 21 having inlet and outlet openings 22 and 23. The outlet end of the valve casing is secured to the pipe 17 as clearly shown in Fig. 3 of the drawings. Each valve casing is provided with a valve seat 24 adjacent the inlet end 22 thereof and a flat valve 25 is adapted to seat on the same so as to prevent air entering the pipe line and to prevent oil entering the tank from the pipe line. The upper terminal of the flat valve 25 is secured to a pivot pin 26 which has the terminals thereof journaled in the sides of the valve casing. The central portion of the outer face of the flat valve has pivotally secured thereto as at 27 the outwardly extending stem 28, which passes through and beyond the inlet end 22 of the valve casing and this rod is slidably received in an opening 29 formed in the arcuate lever 30 which projects upwardly and inwardly toward the valve and is pivoted at its upper terminal to and between the bars 31 of a support 33 by means of a pivot pin 32. The bars 31 have their lower terminals bent outwardly and secured to the upper surface of the valve casing at the inlet end thereof. A guide 35 is secured adjacent the outlet end of the valve casing and includes a pair of spaced bars 36 which have their lower terminals bent outwardly to provide attaching feet 37 which are bolted or otherwise secured to the valve casing. The guide 35 extends a slight distance above the support 33 and the rods 36 thereof are connected at their upper terminals by a stop 39. The lower end of the arcuate lever 30 is twisted at right angles to permit it to slidably receive the stem 28. The outer terminal of the stem 28 has adjustably fitted thereon a stop 40 which is adapted to be engaged by the arcuate lever 30 so that when the same moves outwardly the rod will be moved and move the valve 2 to its seat and prevent the entrance of air into the pipe line.

An operating lever 41 is pivoted to the upper end of the support 33 by the pin 42. It is located between the bars 31 of this support, and it extends forwardly and rearwardly beyond the ends of the valve casing 21.

A connecting link 43 is pivotally secured as at 44 to the forward terminal of the operating lever 41 and extends downwardly therefrom and is pivotally secured as at 45 to the arcuate lever 30 adjacent the lower end thereof. The operating lever 41 extends between the rods 36 of the guide 35 which forms means for guiding the operating lever in its movements and the stop 39 forms means for limiting upward movement of the lever. The rearward end of the lever 41 has secured thereto a depending rod 46 which extends through the lever and is adjustably held thereto by suitable nuts 47 which are threaded on the rod 46 and engage the upper and lower faces of the lever.

The lower end of the rod 46 has secured thereto a float 48 which is adjustably held on the lever by suitable lock nuts 49 which are threaded on the rod 48 and engage the upper and lower faces of the float.

In operation of the improved device, when it is desired to allow the oil to flow from the tanks 13, 14 and 15 the pipe line man or gager opens the valves 18 and the pump station will send the oil through the pipe line and open the check valves 20 and permit the oil to flow from the tanks into the pipe line. When the tanks are full it will be seen that the float will be raised and thus move the arcuate lever 30 inwardly on the stem 29 away from the stop 40 and permit the valve to open. When the oil in any one of the tanks has become exhausted, the float 48 will lower and act as a weight and swing the arcuate lever 30 outwardly into engagement with the stop 40 and thus hold the valve 25 tightly against the seat which will effectively prevent the entrance of air into the pipe line. When the oil in the tanks is above the level of the float 48 and the pressure is greater on the outside of the tank than on the inside the flat valve will be closed and thus prevent the back flow of oil into the tank.

From the foregoing description it can be seen that an improved automatic valve is provided which will effectively prevent the entrance of air into the pipe line when any one of the tanks is exhausted.

In practice, I have found that the form of my invention illustrated in the accompanying drawings and referred to in the above description, as the preferred embodiment, is the most efficient and practical; yet realizing the conditions concurrent with the adoption of my device will necessarily vary, I desire to emphasize that various minor changes in details of construction, proportion and arrangement of parts may be resorted to, when required without sacrificing any of the advantages of my invention as set forth.

What I claim as new is:

1. In a device of the class described, an automatic valve including a valve casing, a valve seated in said casing adjacent the inlet end thereof, a flat valve pivotally secured in the casing and arranged to fit on said seat, a pair of supports secured to the casing and extending above the same, an operating rod pivotally secured to one of said supports adjacent to the rear end of said rod, a float carried by the outer terminal of said rod, an outwardly extending rod pivotally secured to the valve, an arcuate lever slidably receiving said rod, the upper terminal of said lever being pivotally secured to one of said supports, a stop carried by said last mentioned rod and arranged to engage the outer face of said arcuate lever, and a connecting link pivotally secured to the free end of said actuating rod and the arcuate lever, as and for the purpose specified.

2. In combination, an oil tank, a pipe line having its intake communicating with the tank, a check valve in the pipe line, a float actuated lever, and means connecting the lever to the check valve to permit the check valve to function independently of the float when the float is in raised position and to permit the check valve to be moved into and held in closed position by the float when it reaches its lowest position.

3. In combination, an oil tank, a pipe line having its intake communicating with the tank, a check valve in the pipe line, a pivoted lever, a float connected to the lever, a second pivoted lever, a link connecting the levers, and means connecting the second lever to the check valve to permit the check valve to function independently of the float when the float is in raised position and to permit the check valve to be moved into and held in closed position by the float when it reaches its lowest position.

4. In combination, an oil tank, a pipe line having its intake communicating with the tank, a check valve in the pipe line, a pivoted lever, a float adjustably connected to the lever, a second pivoted lever, a link connecting the levers, and means connecting the second lever to the check valve to permit the check valve to function independently of the float when the float is in raised position and to permit the check valve to be moved into and held in closed position by the float when it reaches its lowest position.

5. In combination, an oil tank, a pipe line having its intake communicating with the tank, a check valve in the pipe line, a lever pivoted adjacent to one of its ends, a second pivoted lever, a link connected to the short arm of the first lever and to the second lever, a float connected to the long arm of the first lever, and means connecting the second lever to the check valve to permit the check valve to function independently of the float when the float is in raised position and to permit the check valve to be moved into and held in closed position by the float when it reaches its lowest position.

In testimony whereof I affix my signature in presence of two witnesses.

ROBERT W. SNYDER.

Witnesses:
S. R. BRUMELLE,
B. F. WATKINS.